United States Patent [19]

Naito

[11] Patent Number: 5,203,170

[45] Date of Patent: Apr. 20, 1993

[54] STIRLING ENGINE GENERATING SYSTEM

[75] Inventor: Yoshihiro Naito, Nagoya, Japan

[73] Assignee: Aisin Seiki Kabushiki Kaisha, Kariya, Japan

[21] Appl. No.: 853,089

[22] Filed: Mar. 17, 1992

[30] Foreign Application Priority Data

Mar. 27, 1991 [JP] Japan ............................. 3-85811

[51] Int. Cl.$^5$ .............................................. F02G 1/06
[52] U.S. Cl. ........................................ 60/524; 60/521; 290/40 C
[58] Field of Search ............... 60/517, 521, 522, 524, 60/525, 641.8; 290/40 R, 40 C

[56] References Cited

U.S. PATENT DOCUMENTS 4,457,133  7/1984  Almstrom et al. ................. 60/524
4,881,372 11/1989  Naito ................................. 60/524 X Primary Examiner—Allen M. Ostrager
Attorney, Agent, or Firm—Burns, Doane, Swecker & Mathis

[57] ABSTRACT

A Stirling engine generating system comprises a Stirling engine driven by solar heat which is used as a heat input source for the engine, a generator driven by the Stirling engine, a temperature sensor detecting the temperature of an operational gas enclosed in an operational space of the engine, an operational gas tank communicated with the operational space via a pair of conduits, one way valves interposed in the corresponding conduits so as to invert the flow direction of the operational gas in each conduit, opening and closing valves each of which is interposed in the respective conduit between the one way valve and the operational gas tank, a field magnet control device for adjusting the rotational speed of the generator and a temperature regulation device for controlling the opening and closing action of the opening and closing valves to vary the operational gas pressure in the operational space in response to a detected signal of the temperature sensor and for controlling the field magnet control device.

4 Claims, 5 Drawing Sheets

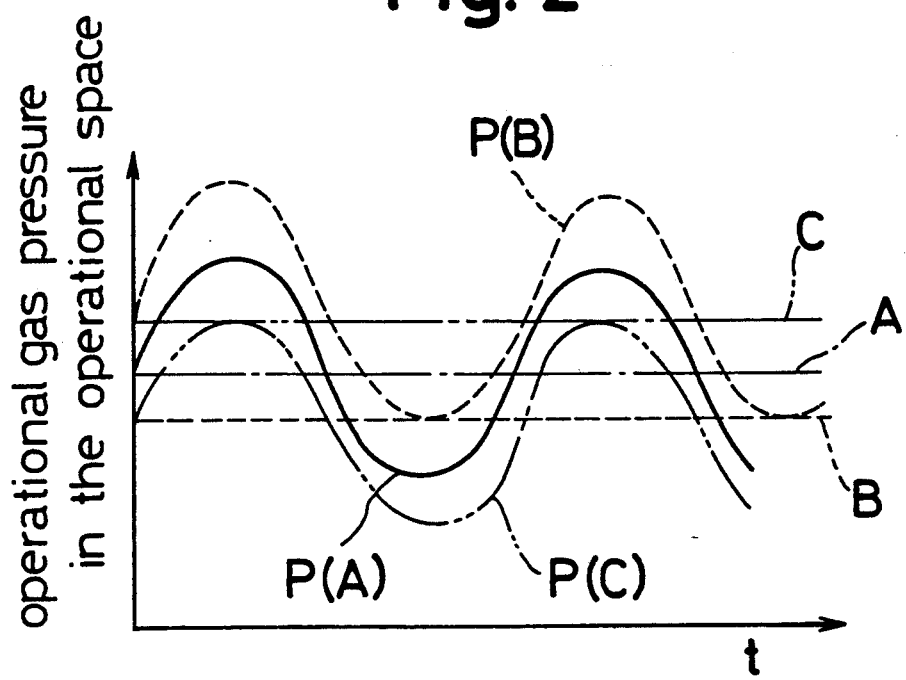
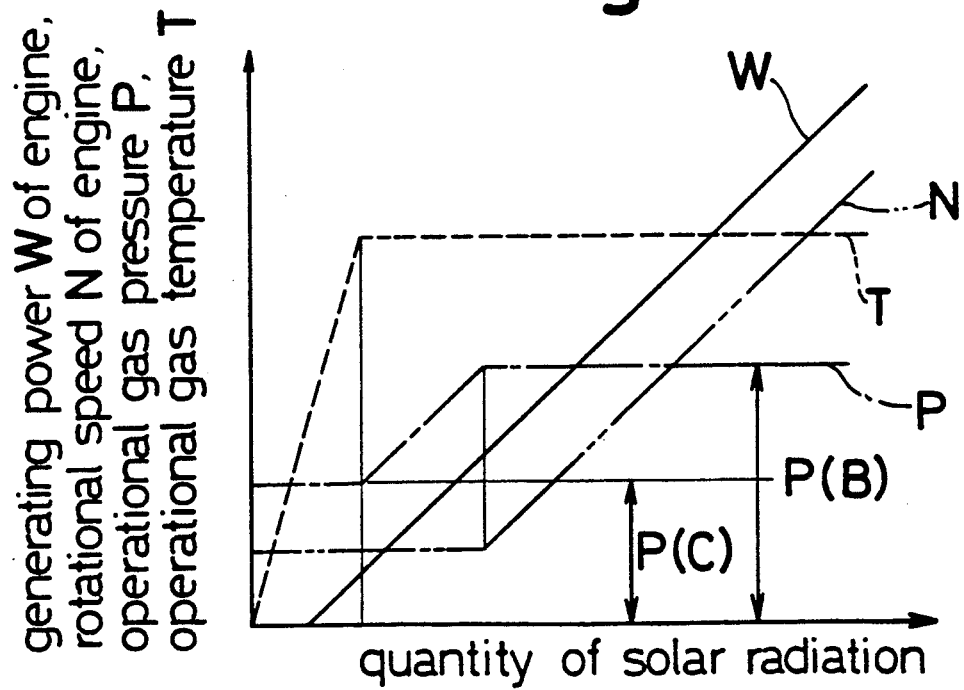

STIRLING ENGINE GENERATING SYSTEM

BACKGROUND OF THE INVENTION

1. Field of the Invention

The present invention relates to a Stirling engine generating system having a Stirling engine in which solar heat is used as a heat source and a generator is driven by the Stirling engine.

2. Description of the Prior Art

In a Stirling engine in which solar heat is used as a heat input source for driving the engine, an output power of the engine varies in dependence on the radiation heat of the solar energy. In order to keep the engine efficiency at a high constant level, it is necessary to keep the temperature of the operational gas in the high temperature portion constant as high as possible.

A system which satisfies the above requirement is disclosed, for example, in U.S. Pat. No. 4,457,133. As shown in FIG. 4, in this system, a Stirling engine 20, for driving a generator 27, is operated by solar energy which is received through a radiation heat receiving hole 21. During this operation, the engine temperature at a high temperature portion is detected by a temperature sensor for 23 for estimating the temperature of an operational gas in the high temperature portion. Then, a temperature regulation device 26 calculates a predetermined value of the operational gas pressure in the engine in response to the estimated operational gas temperature and an operational gas pressure control device 22 regulates the operational gas pressure in the engine so as to let a difference ΔP zero which is between the predetermined value and a detected value of an operational gas pressure sensor 25 at a difference device 24 (FIG. 6). Thereby, the engine efficiency is kept at a high level. As shown in FIG. 7, however, a wide regulation range of the operational gas pressure is required so that the high engine efficiency can be kept at a set level throughout the range within which the engine can generate a power in response to the change of the solar heat for ensuring the constant rotational speed of the engine. Therefore, in this system, an operational gas compressor 30 which is disposed in the operational gas pressure control device 22 is required as an essential component as shown in FIG. 5.

However, the above operational gas compressor, which generates a high pressure, has to be driven without lubrication so as not to pollute the clean operational gas. Therefore, the reliability and the durability of the system deteriorated.

SUMMARY OF THE INVENTION

It is, therefore, an object of the present invention to provide an improved Stirling engine generating system which overcomes the above drawbacks.

It is another object of the present invention to provide an improved Stirling engine generating system which can keep the high engine efficiency regardless of the power range of the engine without deteriorating the reliability and the durability of the system.

It is a further object of the present invention to provide an improved Stirling engine generating system which can keep the high engine efficiency regardless of the power range of the engine without using an operational gas compressor.

In order to achieve these objects, there is provided a Stirling engine generating system which includes a Stirling engine driven by the solar heat which is used as a heat input source of the engine, a generator driven by the Stirling engine, a temperature sensor detecting the temperature of an operational gas enclosed in an operational space of the engine, an operational gas tank communication with the operational space via a pair of conduits, one way valves interposed in the corresponding conduits so as to invert the flow direction of the operational gas in each conduit, opening and closing valves each of which is interposed in the respective conduit between the one way valve and the operational gas tank, an adjustable field magnet control device, the rotational speed of the generator and a temperature regulation device controlling the opening and closing action of the opening and closing valves for varying the operational gas pressure in the operational space in response to a detected signal of the temperature sensor and controlling the field magnet control device.

BRIEF DESCRIPTION OF THE DRAWINGS

Additional objects and advantages of the present invention will become more apparent from the following detailed description of a preferred embodiment thereof when considered with reference to the attached drawings, in which:

FIG. 2 is a characteristic diagram in which are shown a relationship between an operational gas pressure in an engine and time, and another relationship between an operational gas pressure in the operational gas tank and time in an embodiment of Stirling engine generating system in accordance with the present invention;

FIG. 3 is a characteristic diagram in which are shown a relationship between quantity of solar radiation and the generating power of an engine, another relationship between quantity of solar radiation and rotational speed of an engine, a third relationship between quantity of solar radiation and an operational gas pressure in an engine, and a fourth relationship between quantity of solar radiation and an operational gas temperature in an engine in an embodiment of a Stirling engine generating system in accordance with the present invention;

DESCRIPTION OF THE PREFERRED EMBODIMENT

A Stirling engine generating system constituted in accordance with an embodiment of the present invention will be decribed hereinafter with reference to the drawings.

Figure 1:
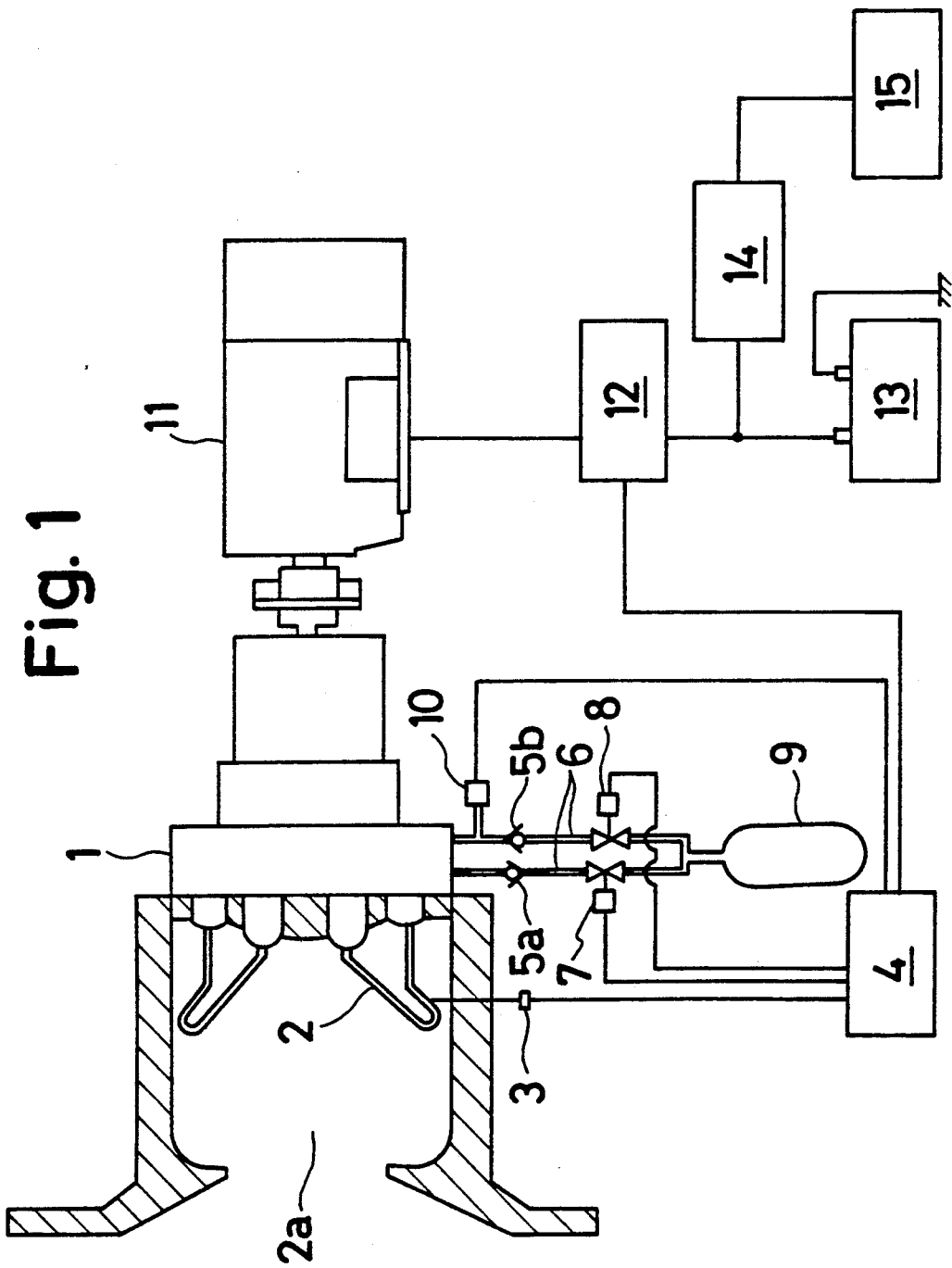
FIG. 1 is a schematic illustration of an embodiment of a Stirling engine generating system in accordance with the present invention.
Figure 4:
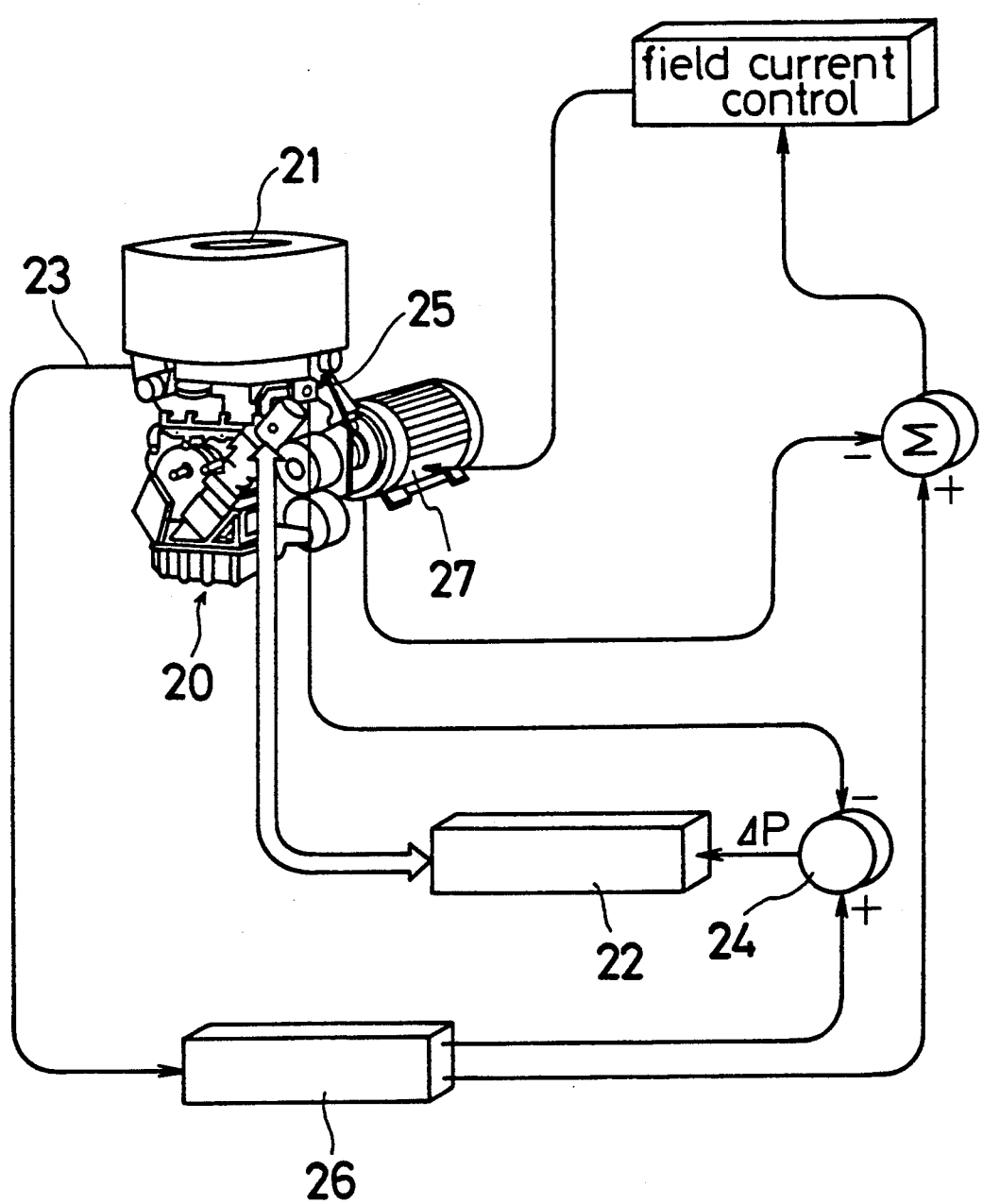
FIG. 4 is a schematic illustration of a conventional Stirling engine generating system.
Figure 5:
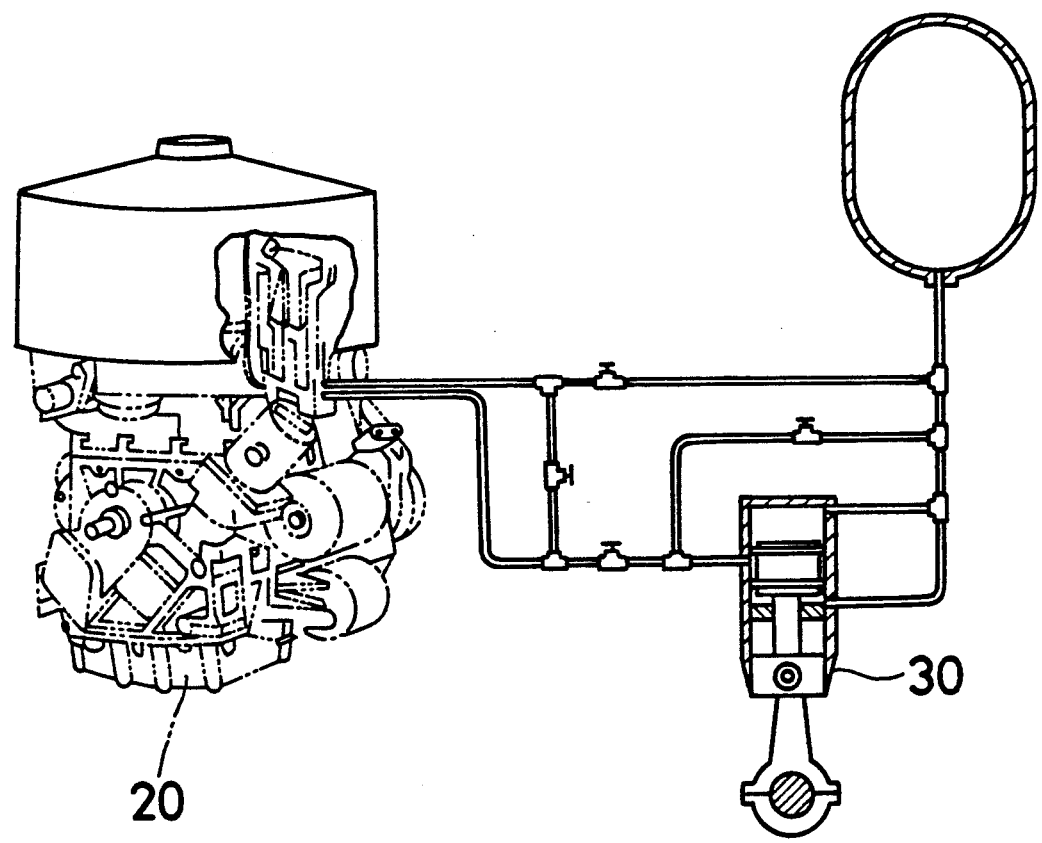
FIG. 5 is a schematic illustration of an operational gas temperature regulation device of a conventional Stirling engine generating system.
Figure 6:
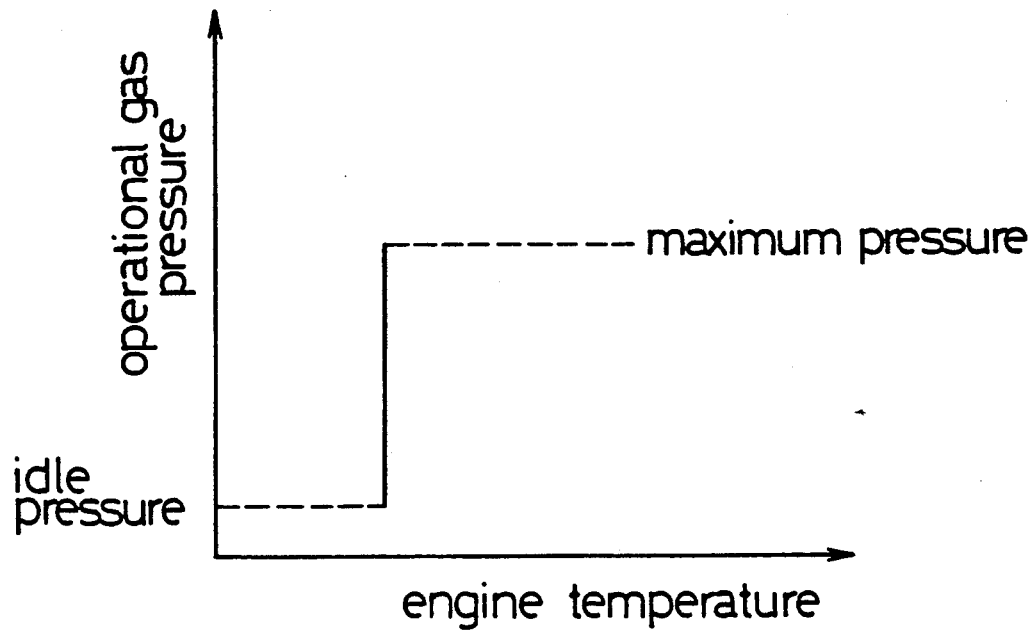
FIG. 6 is a characteristic diagram which shows a relationship between an operational gas pressure and temperature of an engine in a conventional Stirling engine generating system.
Figure 7:
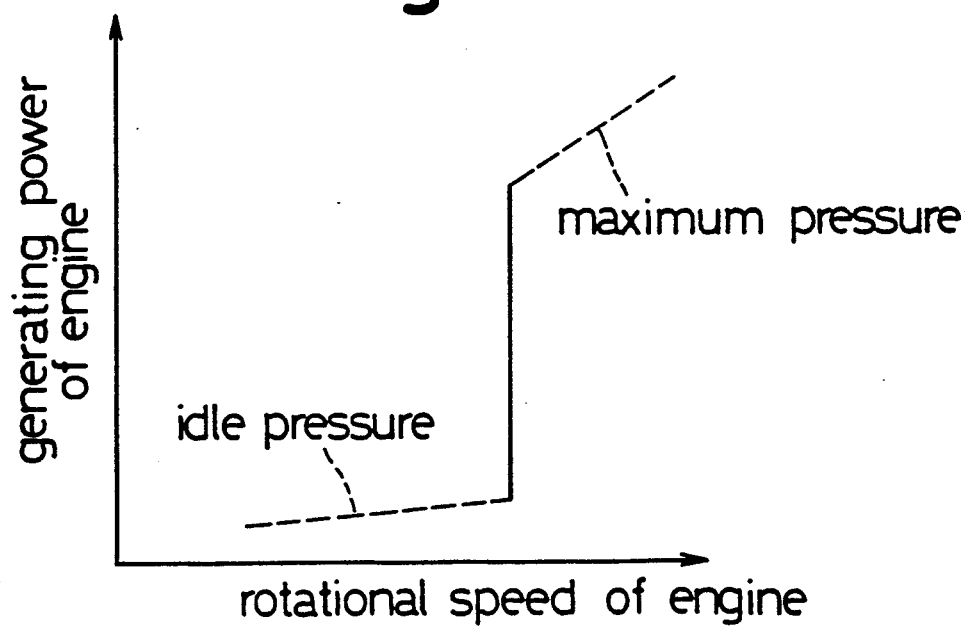
FIG. 7 is a characteristic diagram which shows a relationship between the rotational speed of an engine and the generating power of an engine in a conventional Stirling engine generating system.

Referring to FIG. 1, a Stirling engine 1 is set to be driven by solar heat in which it is used as a heat input source. Namely, a heater 2 including a plurality of circularly arranged pipes as are well known is heated by solar heat energy which is received through a radiation heat receiving hole 2a and therefore an operational gas which is enclosed in an operational space is heated by the heater 2. In the heater 2, a temperature sensor 3 which detects the temperature of the operational gas flowing in the heater 2 is disposed. The operational space of the Stirling engine 1 is in fluid communication with an operational gas tank 9 via a pair of pressure conduits 6, 6 as conduits of the present invention. In the pressure conduits 6, 6, one way valves 5a, 5b are interposed, respectively. Furthermore, electromagnetic valves 7, 8 as opening and closing valves of the present invention are interposed in the conduits 6, 6 between the one way valves 5a, 5b and the operational gas tank 9, respectively. The one way valve 5a permits the operational gas to flow from the operational gas tank 9 to the operational space and prevents the gas flow from the operational space to the operational gas tank 9. On the other hand, the one way valve 5b permits the operational gas to flow from the operational space to the operational gas tank 9 and prevents gas flow from the operational gas tank 9 to the operational space. Accordingly, when the electromagnetic valve 7 is opened, the operational gas in the operational gas tank 9 flows into the operational space and therefore the operational gas pressure in the operational space is increased. Namely, the electromagnetic valve 7 acts as a valve for increasing the operational gas pressure in the operational space. On the other hand, when the electromagnetic valve 8 is opened, the operational gas in the operational space flows into the operational gas tank 9 and therefore the operational gas pressure in the operational space is decreased. Namely, the electromagnetic valve 8 serves as a valve for decreasing the operational gas pressure in the operational space. It is to be noted that instead of the electrically operated opening and closing valve, another opening and closing valve which is set to be operated by other means such as gas is available.

Furthermore, in a portion of the pressure conduit 6 to which the Stirling engine 1 is connected, a pressure sensor 10 for detecting the operational gas pressure in the operational space is disposed. The detected signal of the pressure sensor 10 and the detected signal of the temperature sensor 3 are supplied to a temperature regulation device 4. The opening and closing actions of the above electromagnetic valves 7, 8 are under the control of the temperature regulation device 4.

The reference numeral 11 shows a generator which is driven by the foregoing Stirling engine 1. The generated output of the generator 11 is supplied to a battery 13 via a field magnet control device 12 and is charged therein. In the case that the generator 11 is an A.C. generator, the field magnet control device 12 has a function for transforming from A.C. into D.C.. The reference numeral 14 shows a device for preventing the excessive charge and the excessive discharge of the battery 13 and the reference numeral 15 shows an electric load. Now, the field magnet control device 12 is controlled by the temperature regulation device 4 and controls the rotational speed of the Stirling engine 1 and the rotational speed of the generator 11.

The above-described embodiment of the Stirling engine generating system operates as follows: The heater 2 of the Stirling engine 1 is heated by solar heat energy which is received through the radiation heat receiving hole 2a. Thereby, the operational gas which flows in the heater 2 is heated. When the operational gas temperature which is detected by the temperature sensor 3 reaches the predetermined value, the Stirling engine 1 begins to drive by the temperature regulation device 4. At this time, the operational gas pressure in the operational space is on a level P(C) which is shown in FIG. 2 and the operational gas pressure in the operational gas tank 9 is on a level C which is shown in FIG. 2. In case that the quantity of the solar heat energy received through the radiation heat receiving hole 2a is more than the cycle endothermic quantity of the Stirling engine 1, the operational gas temperature in the operational space keeps rising. When the operational gas temperature in the operational space reaches the predetermined optimum temperature for driving the engine (for keeping the the engine efficiency constant at a high level) and further continues to rise, the electromagnetic valve 7 is opened by the temperature regulation device 4 in response to the detected signal of the temperature sensor 3 and the operational gas in the operational gas tank 9 is supplied to the operational space of the Stirling engine 1 so as to increase the operational gas pressure in the operational space and so as to keep the operational gas temperature at the predetermined optimum temperature. Even though the electromagnetic valve 7 is opened, however, the operational gas pressure in the operational space of the Stirling engine 1 does not rise more than a level P(B) which is shown in FIG. 2. The pressure P(B) is a value which is influenced by the volume of the operational space of the Stirling engine 1, the compression ratio of the Stirling engine 1 and the volume of the operational gas tank 9 and therefore it is not possible to regulate the operational gas pressure so that the high engine efficiency is kept over all of the range during which the engine can generate power in response to the change of the quantity of solar radiation (it is not able to regulate the operational gas pressure so that the operational gas temperature in the operational space is kept at the predetermined optimum temperature.). Thereby, in the case in which there is a relatively large quantity of solar radiation, even though the operational gas pressure in the operational space which is detected by the pressure sensor 10 is on the level P(B), a condition under which the operational gas temperature in the operational space exceeds the predetermined optimum temperature arises. Now, the level P(B) corresponds to a determined pressure of the present invention. At this time, the temperature regulation device 4 controls the field magnet control device 12 so as to increase the frequency of the rotational magnetic field of the generator 11 (in case of A.C.generator). Now, in case of D.C.generator, the temperature regulation device 4 controls the field magnet control device 12 so as to decrease the field current. Thereby, the rotational speed of the generator 11 and the rotational speed of the Stirling engine 1 which is directly connected with the generator 11 are increased, respectively. As a result, the cycle endothermic quantity of the Stirling engine 1 increases and thereby the operational gas temperature in the operational space is kept at the predetermined optimum temperature. Accordingly, the high engine efficiency is maintained over all of the range in which the engine can generate power in response to the change of the quantity of solar radiation without using the operational gas compressor. Now, the generated output of the generator 11 is charged in the battery 13 or is supplied to the electric load 15. In FIG. 2, a curve P(A) shows the operational gas pressure in the operational space under the basic condition. Furthermore, a straight line "A" shows the operational gas pressure under the condition under which the operational gas pressure in the operational space is on the level P(A) and a straight line "B" shows the operational gas pressure under the condition under which the operational gas pressure in the operational space is on the level P(B).

In this embodiment, the operational gas pressure in the operational space is changed as a first step of the temperature regulation and then the rotational speed of the Stirling engine 1 is changed as a second step of the temperature regulation. In the present invention, however, it is possible to control the rotational speed of the Stirling engine 1 as the first step and then it is possible to control the operational gas pressure in the operational space as the second step. Furthermore, it is possible to compositively change the operational gas pressure in the operational space and the rotational speed of the Stirling engine 1.

Furthermore, the operational gas tank 9 in FIG. 1 may be composed of plural gas tanks which have different pressure levels, respectively. In this case, these tanks are selectively communicated with the Stirling engine 1 and thereby it is possible to enlarge the width between the operational gas pressures P(C) and P(B). In general, in the Stirling engine generating system which utilizes sloar heat energy, the control ranges of the operational gas pressure and the rotational speed of the engine which are controlled in response to the quantity of solar radiation are determined considering the solar radiation condition of the installed location of the system and the performance (efficiency) characteristics of the Stirling engine. In FIG. 3, the characteristic diagram which are include a relationship between the quantity of solar radiation and the generating power W of an engine, a relationship between the quantity of solar radiation and the rotational speed N of an engine, a relationship between the quantity of solar radiation and an operational gas pressure P in an engine and a relationship between the quantity of solar radiation and an operational gas temperature T in an engine in the Stirling engine generating system in accordance with the present invention.

As mentioned above, according to the present invention, it is possible to keep the high engine efficiency over all of the range in which the engine can generate power in response to the change of the quantity of solar radiation without using the operational gas compressor and it is to generate electricity under this condition at the same time. Furthermore, according to the present invention, since the operational gas compressor which has to be driven without the lubrication is not used, it is possible to improve the reliability and the durability of the system per se.

The principles, a preferred embodiment and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in appended claims.

What is claimed is:

1. Stirling engine generating system comprising;
   a Stirling engine driven by solar heat which is used as a heat input source of the engine;
   a generator driven by the Stirling engine;
   a temperature sensor for detecting the temperature of an operational gas enclosed in an operational space of the engine;
   a pressure sensor for detecting an operational gas pressure in the operational space;
   an operational gas tank in communication with the operational space via a pair of conduits;
   a one way valve interposed in each of the conduits so as to invert the flow direction of the operational gas in each conduit;
   an opening and closing valve interposed in both conduits between the one way valve and the operational gas tank;
   a field magnet control device for adjusting the rotational speed of the generator; and
   a temperature regulation device for controlling the opening and closing action of the opening and closing valves to vary the operational gas pressure in the operational space in response to a detected signal of the temperature sensor and for controlling the field magnet control device to vary the field current of the generator when the operational gas pressure in the operational space is at a determined pressure and the operational gas temperature in the operational space exceeds a predetermined optimum temperature.

2. A Stirling engine generating system as recited in claim 1, wherein the temperature regulation device controls the opening and closing valves and the field magnet control device so as to keep the operational gas temperature detected by the temperature sensor at the predetermined optimum temperature.

3. A Stirling engine generating system as recited in claim 2, wherein the generator is an A.C. generator and the temperature regulation device controls the field magnet control device so as to increase the frequency of the rotational magnetic field of the generator when the operational gas pressure in the operational space is at a determined pressure and the operational gas temperature in the operational space exceeds the predetermined optimum temperature.

4. A Stirling engine generating system as recited in claim 2, wherein the generator is a D.C. generator and the temperature regulation device controls the field magnet control device so as to decrease the field current of the generator when the operational gas pressure in the operational space is at a determined pressure and the operational gas temperature in the operational space exceeds the predetermined optimum temperature.

* * * * *